US012038968B2

(12) United States Patent
Wang

(10) Patent No.: US 12,038,968 B2
(45) Date of Patent: Jul. 16, 2024

(54) METHOD AND DEVICE FOR PERSONALIZED SEARCH OF VISUAL MEDIA

(71) Applicant: SAMSUNG ELECTRONICS CO., LTD., Suwon-si (KR)

(72) Inventor: Chengjun Wang, Jiangsu (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/887,235

(22) Filed: Aug. 12, 2022

(65) Prior Publication Data

US 2023/0050371 A1  Feb. 16, 2023

Related U.S. Application Data

(63) Continuation of application No. PCT/KR2022/011785, filed on Aug. 8, 2022.

(30) Foreign Application Priority Data

Aug. 13, 2021  (CN) .......................... 202110928309.7

(51) Int. Cl.
*G06F 16/532* (2019.01)
*G06F 16/583* (2019.01)
*G06F 40/30* (2020.01)

(52) U.S. Cl.
CPC .......... *G06F 16/532* (2019.01); *G06F 16/583* (2019.01); *G06F 40/30* (2020.01)

(58) Field of Classification Search
CPC ...... G06F 16/532; G06F 16/583; G06F 40/30; G06F 40/151; G06F 40/295
See application file for complete search history.

(56) References Cited

U.S. PATENT DOCUMENTS 5,751,286 A * 5/1998 Barber ................ G06F 16/5862
　　　　　　　　　　　　　　　　　　　　707/E17.025
8,521,680 B2   8/2013 Lin
(Continued)

FOREIGN PATENT DOCUMENTS

CN　　　107145519 A　　9/2017
CN　　　107832286 A　　3/2018
(Continued)

OTHER PUBLICATIONS

Communication dated Nov. 10, 2022 issued by the International Searching Authority in International Application No. PCT/KR2022/011785.

(Continued)

*Primary Examiner* — Cam Y T Truong
(74) *Attorney, Agent, or Firm* — Sughrue Mion, PLLC

(57) ABSTRACT

The application discloses a method and device for personalized search of visual media. Semantic analysis is conducted on a visual media query text of a user to obtain visual semantic information, time information and/or location information. Semantic similarity matching is conducted on a result of the semantic analysis and attribute data of each visual medium within a specified search range to obtain a query similarity of the visual medium. The visual medium is an image or a video, and the attribute data include personalized visual semantic information, personalized time information and/or personalized location information. A corresponding visual media query result is generated based on the query similarity. By adopting the application, users are provided with visual media which is a result of a personalized.

20 Claims, 6 Drawing Sheets

(56) References Cited

U.S. PATENT DOCUMENTS

| | | | |
|---|---|---|---|
| 10,552,471 | B1 | 2/2020 | Dandekar et al. |
| 10,805,647 | B2 | 10/2020 | Zhang et al. |
| 2006/0074771 | A1 | 4/2006 | Kim et al. |
| 2010/0205202 | A1* | 8/2010 | Yang .................... G06F 16/532 707/E17.03 |
| 2014/0114643 | A1 | 4/2014 | Baker et al. |
| 2017/0004383 | A1 | 1/2017 | Lin et al. |
| 2017/0061250 | A1 | 3/2017 | Gao et al. |
| 2020/0073901 | A1* | 3/2020 | Stein .................... G06F 16/9535 |
| 2021/0357362 | A1* | 11/2021 | Munk ..................... G06F 16/13 |

FOREIGN PATENT DOCUMENTS

| | | |
|---|---|---|
| CN | 109684497 A | 4/2019 |
| CN | 110019852 A | 7/2019 |
| CN | 111400607 A | 7/2020 |
| CN | 111797823 A | 10/2020 |
| CN | 111966781 A | 11/2020 |
| CN | 112541091 A | 3/2021 |
| KR | 10-2014-0058409 A | 5/2014 |
| KR | 10-2020-0009888 A | 1/2020 |
| KR | 10-2020-0083159 A | 7/2020 |
| WO | 2021/042763 A1 | 3/2021 |

OTHER PUBLICATIONS

Radford, Alec et al., "CLIP: Connecting Text and Images", OpenAI, Jan. 5, 2021, https://openai.com/blog/clip/,. (15 pages total).

Lerman, Kristina et al., "Personalizing Image Search Results on Flickr", arXiv:0704. 1676v1 [cs.IR], Apr. 12, 2007. (11 pages total).

Office Action dated Jan. 16, 2024, issued by the China National Intellectual Property Administration in Chinese Application No. 202110928309.7.

* cited by examiner

METHOD AND DEVICE FOR PERSONALIZED SEARCH OF VISUAL MEDIA

CROSS-REFERENCE TO RELATED APPLICATIONS

This application is a Bypass Continuation of PCT International Application No. PCT/KR2022/011785 filed on Aug. 8, 2022, which claims priority under 35 U.S.C. § 119(a) to Chinese Patent Application No. 202110928309.7 filed on Aug. 13, 2021. The above applications are hereby expressly incorporated by reference, in their entirety, into the present application.

TECHNICAL FIELD

This disclosure relates to computer application technologies, in particular to a method and device for personalized search of visual media.

BACKGROUND ART

With the wide application of the photo-shooting function of smart terminal equipment, people have an ever high demand for photo album retrieval of smart terminal equipment, hoping to realize personalized visual media search (including the search for pictures and videos). For example, when a user enters the query sentence "Search for daughter's birthday photos last year," corresponding photos can be picked out from the photo album and displayed to the user.

In view of the above-mentioned personalized visual media search demand, the inventor found through research in the process of realizing this application that existing visual media search solutions cannot meet the personalized query requirement for reasons as below.

The existing visual media query solutions are based on the semantic information of images, and cannot identify the user-specific information of images. To protect users' privacy, when training a server-side model for semantic search, training and recognition based on users' personalized information are not suitable, so it is impossible to obtain a search model that can identify users' personalized information based on image contents, and thus users' personalized query demand cannot be met. For example, the existing visual media query solutions can recognize a shooting subject in an image as a girl, but cannot tell the relationship between the shooting subject and the current query user, thus failing to meet the personalized search demand like "Search for daughter's birthday photos last year."

SUMMARY

In view of this, embodiments provide a method and device for personalized search of visual media, which can meet the demand of users for personalized search of visual media.

In order to fulfill the above purpose, some embodiments adopt the following technical solution.

Provided herein is a method for personalized search of visual media, including: conducting semantic analysis on a visual media query text of a user to obtain visual semantic information, time information and/or location information contained therein; conducting semantic similarity matching on a result of the semantic analysis and attribute data of each visual medium within a specified search range to obtain a query similarity of the visual medium, wherein the visual medium is an image or a video, and the attribute data include personalized visual semantic information, personalized time information and/or personalized location information; and generating a corresponding visual media query result based on the query similarity.

Some embodiments further provide a device for personalized search of visual media, the device including: a semantic analysis module for conducting semantic analysis on a visual media query text of a user to obtain visual semantic information, time information and/or location information contained therein; a matching module for conducting semantic similarity matching on a result of the semantic analysis and attribute data of each visual medium within a specified search range to obtain a query similarity of the visual medium, wherein the visual medium is an image or a video, and the attribute data include personalized visual semantic information, personalized time information and/or personalized location information; and a result generating module for generating a corresponding visual media query result based on the query similarity.

Some embodiments further provide an electronic device for personalized search of visual media, comprising a processor and a memory. The memory stores an application program executable by the processor for causing the processor to execute the method for personalized search of visual media as described above.

Some embodiments further provide a computer readable storage medium having a computer readable instruction stored thereon, wherein the computer readable instruction is used for executing the method for personalized search of visual media as described above.

To sum up, according to the method and device for personalized search of visual media provided herein, during personalized search of visual media, firstly, semantic analysis is conducted on a visual media query text of a user to obtain a variety of information for personalized search, including visual semantic information, time information and/or location information contained therein; then semantic similarity matching is conducted on attribute data of each visual medium within a specified search range based on the information to obtain a query similarity of the visual medium; and finally a corresponding visual media query result is generated based on the query similarity of the visual media. In this way, the search of visual media is no longer only based on the semantic information of images, but also makes full use of users' personalized information, thus meeting the demand of users for personalized search of visual media.

DETAILED DESCRIPTION

In order to make the object, technical solution and advantages of the disclosure clearer, embodiments will be further described in detail below with reference to the drawings and specific embodiments.

Figure 1:
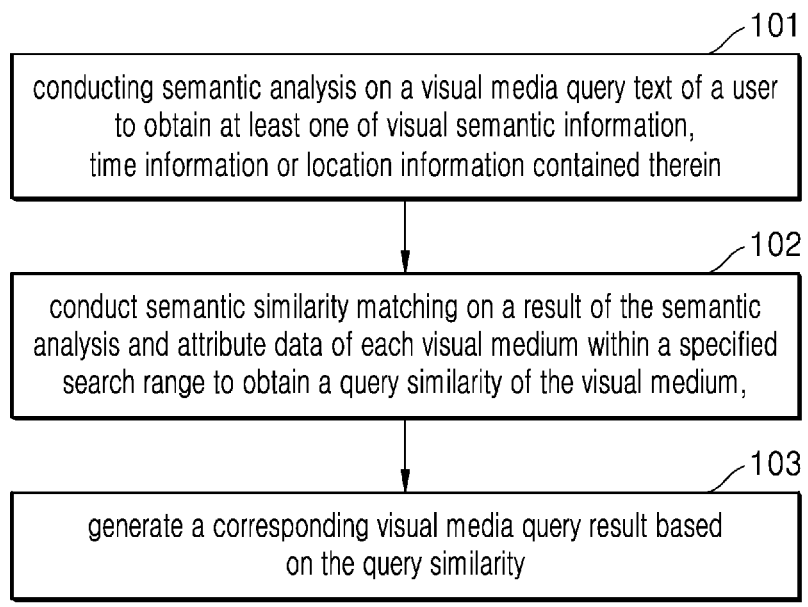
FIG. 1 is a flowchart of a method according to some embodiments.

FIG. 1 is a flowchart of a method for personalized search of visual media according to some embodiments. As shown in FIG. 1, the embodiment mainly comprises:

Operation 101, conducting semantic analysis on a visual media query text of a user to obtain visual semantic information, time information and/or location information contained therein.

This operation is different from existing search solutions in that semantic analysis of the visual media query text of the user is no longer limited to obtaining the semantic information of a search target image, but also needs to obtain the personalized information of the user, such as the relationship between those in the target image and the user (such as wife or daughter of the user), the special meaning of the shooting time of the target image for the user (such as wedding anniversary and children's birthday), and the special meaning of the shooting location of the target image for the user (such as home, company and sightseeing place). In this way, the visual media query text can carry more personalized information, for example, the query text can be "Search for baby's one year old photos," which can make full use of the personalized information of the user for searching and matching. Therefore, the demand of users for personalized search of visual media can be met, and the flexibility and smart level of visual media search are improved.

Operation 102, conducting semantic similarity matching on a result of the semantic analysis and attribute data of each visual medium within a specified search range to obtain a query similarity of the visual medium, wherein the visual medium is an image or a video, and the attribute data include personalized visual semantic information, personalized time information and/or personalized location information.

This operation is used to perform semantic similarity matching based on the result of the semantic analysis of the visual media query text in operation 101, so as to obtain the matching degree between each visual medium within the specified search range and the current visual media query text (i.e., the above query similarity).

Here, the attribute data of each visual medium within the specified search range need to include personalized visual semantic information, personalized time information and/or personalized location information, so that personalized matching with the visual media query text can be realized.

The search range can be determined by those skilled in the art according to actual needs. For example, the search range can be, but not limited to, a local photo album of user equipment or some visual media selected by the user in the local photo album, or a visual media photo album uploaded by the user to the cloud, etc. In order to better protect user privacy, the search range is preferably defined locally in the user equipment.

In an embodiment, the attribute data of each visual medium within the specified search range can be generated based on the local personalized information of the user equipment after photos are taken with the user equipment.

Generating the attribute data for the visual media based on a preset personalized database of the currently logged-in user after the visual media are shot with smart terminal equipment is described below as Operation y1, Operation y2, Operation y3 and Operation y4.

Operation y1, if the visual medium is a photo, generating a corresponding visual semantic based on the photo; if the visual medium is a video, generating a corresponding visual semantic based on a key frame of the video;

Operation y2, based on the visual semantic, searching through a first personalized database of the currently logged-in user to identify a relationship between a shooting object in the visual media and the logged-in user, if the identification is successful, taking the identified relationship as a personalized tag, and saving the personalized tag together with the visual semantic as the personalized visual semantic information of the visual media; otherwise, saving the visual semantic as the personalized visual semantic information of the visual media, wherein the first personalized database comprises a communication database and/or a picture library.

Specifically, the communication database can be generated by an address book application program on the smart terminal equipment. The picture library can be generated by a picture library application program on the smart terminal equipment, which allows the user to add personalized tags to those in the pictures, such as friend, family member, coworker and other personalized information. Other application programs can be adopted too, as long as they can provide relationship information between the shooting subject and the user.

In operation y2, when the first personalized database of the currently logged-in user is searched through based on the visual semantic to identify the relationship between the shooting object in the visual media and the logged-in user, the identified relationship needs to be taken as a personalized tag and saved together with the visual semantic as the personalized visual semantic information of the visual media, so that the personalized visual semantic information of the visual media contains personalized information. In concrete implementation, when the identified relationship is taken as the personalized tag and saved together with the visual semantic as the personalized visual semantic information of the visual media, it can be saved in the form of plain texts, or in different domains.

When adopting the form of plain texts, the visual semantic with personalized tags can be generated by adding personalized tags to a general non-personalized visual semantic or replacing corresponding image subjects with personalized tags, the visual semantic can also be converted into text information with the same meaning but different descriptions, and these visual semantic information can be merged and saved as the personalized visual semantic information of the visual media. For example, for the non-personalized visual semantic "two people have a candlelight dinner together," it can be learned through personalized identification that the "two people" are the current user "I" and "wife"; in this case, a variety of visual semantics can be obtained based on "two people have a candlelight dinner together": 1. I have a candlelight dinner with my wife; 2. two people have a candlelight dinner together; two people eat together. These visual semantics are saved as the personalized visual semantic information of the corresponding visual media.

When different domains are used to save different personalized visual semantic information, non-personalized visual semantics can be saved in the form of high-dimensional semantic vectors, personalized tags can be saved in the form of text tags, and the two are saved in different domains.

Operation y3, based on a shooting location of the visual media, searching through a second personalized database of the currently logged-in user to identify association information between the shooting location and the logged-in user, if the identification is successful, taking the identified association information as a personalized tag, and saving the personalized tag together with the shooting location as the personalized location information of the visual media; otherwise, saving the shooting location as the personalized location information of the visual media, wherein the second personalized database comprises a personalized location database.

The personalized location database can be generated by a navigation application program on the smart terminal equipment, which allows the user to set personalized tags for different locations. Other application programs can be adopted too, as long as they can provide personalized location information.

Operation y4, based on a shooting time of the visual media, searching through a third personalized database of the currently logged-in user to identify association information between the time information and the logged-in user, if the identification is successful, taking the identified association information as a personalized tag, and saving the personalized tag together with the shooting time as the personalized time information of the visual media; otherwise, saving the shooting time as the personalized time information of the visual media, wherein the third personalized database comprises a personalized time database.

Specifically, the personalized time database can be generated by a calendar application program on the smart terminal equipment, which allows the user to set personalized tags for different times and dates, such as birthday, wedding anniversary, etc. Other application programs can be adopted too, as long as they can provide personalized time information.

The above operations y2-y4 are not limited to a certain time sequence.

By using the above operations y1-y4, when the user takes photos or videos, attribute data can be generated for the photos or videos taken by the user based on the personalized databases stored on the user equipment (i.e., the above-mentioned first personalized database, second personalized database and third personalized database), so that the attribute data contain not only the semantic information of the images themselves, but also the personalized information of the user, so as to support personalized search.

For example, in operation 102 of FIG. 1, when semantic similarity matching is conducted on the result of the semantic analysis and the attribute data of the visual media, semantic similarity matching is firstly conducted on different types of information obtained by the semantic analysis and corresponding attribute data of the visual media, and then all semantic similarity values of the visual media are weighted to obtain a total semantic similarity as the query similarity of the visual media. Accordingly, in one embodiment, the following method can be used for conducting semantic similarity matching on the result of the semantic analysis and the attribute data of each visual medium within a specified search range.

If the result of the semantic analysis contains visual semantic information, conducting similarity matching on the visual semantic information and the personalized visual semantic information of the visual media to obtain a visual semantic similarity of the visual media.

If the result of the semantic analysis contains time information, conducting similarity matching on the time information and the personalized time information of the visual media to obtain a time semantic similarity of the visual media.

If the result of the semantic analysis contains location information, conducting similarity matching on the location information and the personalized location information of the visual media to obtain a location semantic similarity of the visual media.

Finally, based on the visual semantic similarity, the time semantic similarity and/or the location semantic similarity of the visual media, obtaining the query similarity of the visual media according to a weighted calculation method.

In practical application, when similarity matching is conducted on the visual semantic information in the result of the semantic analysis and the personalized visual semantic information of the visual media, whether the personalized visual semantic information of the visual media contains a high-dimensional semantic vector can be considered. If so, before similarity matching, a corresponding high-dimensional semantic vector needs to be generated first based on the visual semantic information obtained from the semantic analysis to be matched with the high-dimensional semantic vector of the visual media. Accordingly, in an embodiment, when the personalized visual semantic information of the visual media contains a high-dimensional semantic vector, the following method including operations x1 and x2 can be used for conducting similarity matching on the visual semantic information and the personalized visual semantic information of the visual media.

Operation x1 is generating a corresponding high-dimensional semantic vector based on the visual semantic information obtained by the semantic analysis, and conducting similarity matching on the high-dimensional semantic vector obtained through conversion and the high-dimensional semantic vector in the personalized visual semantic information of the visual media to obtain a first visual semantic similarity of the visual media.

If the visual semantic information obtained by the semantic analysis contains personalized description information related to a query target and the personalized visual semantic information of the visual media contains personalized tag information, operation x1 conducts similarity matching on the personalized description information and the personalized tag information to obtain a second visual semantic similarity of the visual media.

In operation x2, if the second visual semantic similarity exists in the visual media, obtaining the visual semantic similarity of the visual media according to a weighted calculation method based on the first visual semantic similarity and the second visual semantic similarity. Otherwise, operation x2 takes the first visual semantic similarity as the visual semantic similarity of the visual media.

In an embodiment, when the personalized visual semantic information of the visual media only contains text information (that is, the personalized visual semantic information of the visual media is pure text information, such as personalized tags), similarity matching can be directly conducted on the visual semantic information obtained by the semantic analysis and the personalized visual semantic information of the visual media to obtain the visual semantic similarity of the visual media.

Operation 103 of FIG. 1 generates a corresponding visual media query result based on the query similarity.

This operation is used to further generate a corresponding query result based on the query similarity of each visual medium obtained in operation 102. Specifically, a corresponding result can be generated according to a preset query strategy. For example, other visual media whose similarity reaches a certain threshold can be displayed as the query result according to the order of query similarity, or all visual media can be displayed according to the descending order of query similarity, which is not limited here.

Based on the above embodiments, it can be seen that according to the method for personalized search of visual media, the personalized search of visual media is no longer only based on the semantic information of images, but also makes full use of users' personalized information, thus meeting the demand of users for personalized search of visual media. The specific implementation of the above method will be described in detail below in conjunction with several specific application scenarios.

Figure 2:
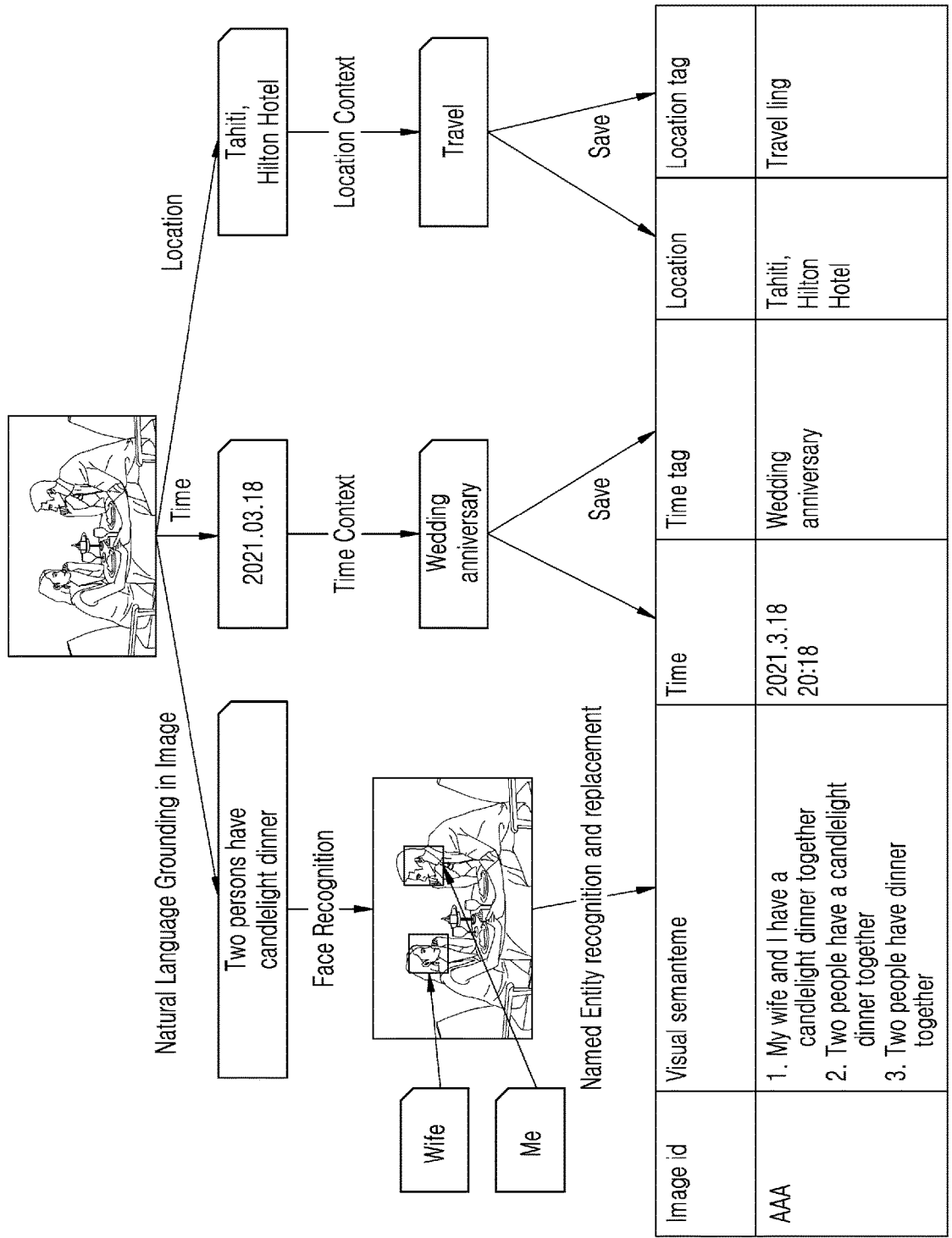
FIG. 2 is a diagram of a process of generating attribute data for a photo taken by a user based on some embodiments.

Scenario 1: FIG. 2 is a diagram of a process of generating attribute data for a photo taken by a user based on some embodiments. As shown in FIG. 2, the process of generating attribute data includes the following operations.

1. Taking, by a user, a new picture with a camera application.
2. Generating, at a back end, a non-personalized visual semantic (using an image annotation technology), time information (shooting time) and location information (GPS) corresponding to the picture.
3. Analyzing personalized semantics and generating tags to be saved, including a personalized visual semantic, a time semantic and a location semantic; (1) visual semantic: entities (such as my wife and I in FIG. 2) are obtained through face recognition, and personalized information is added to the non-personalized visual semantic through a named entity recognition technology in natural language processing (NLP); for example, "two people have a candlelight dinner together" is converted into "My wife and I have a candlelight dinner together"; (2) time semantic: obtained by analyzing databases of other applications such as calendar; (3) location semantic: judged by databases such as common locations of sub-users.
4. Saving non-personalized original semantics and personalized tags for querying use.

Figure 3:
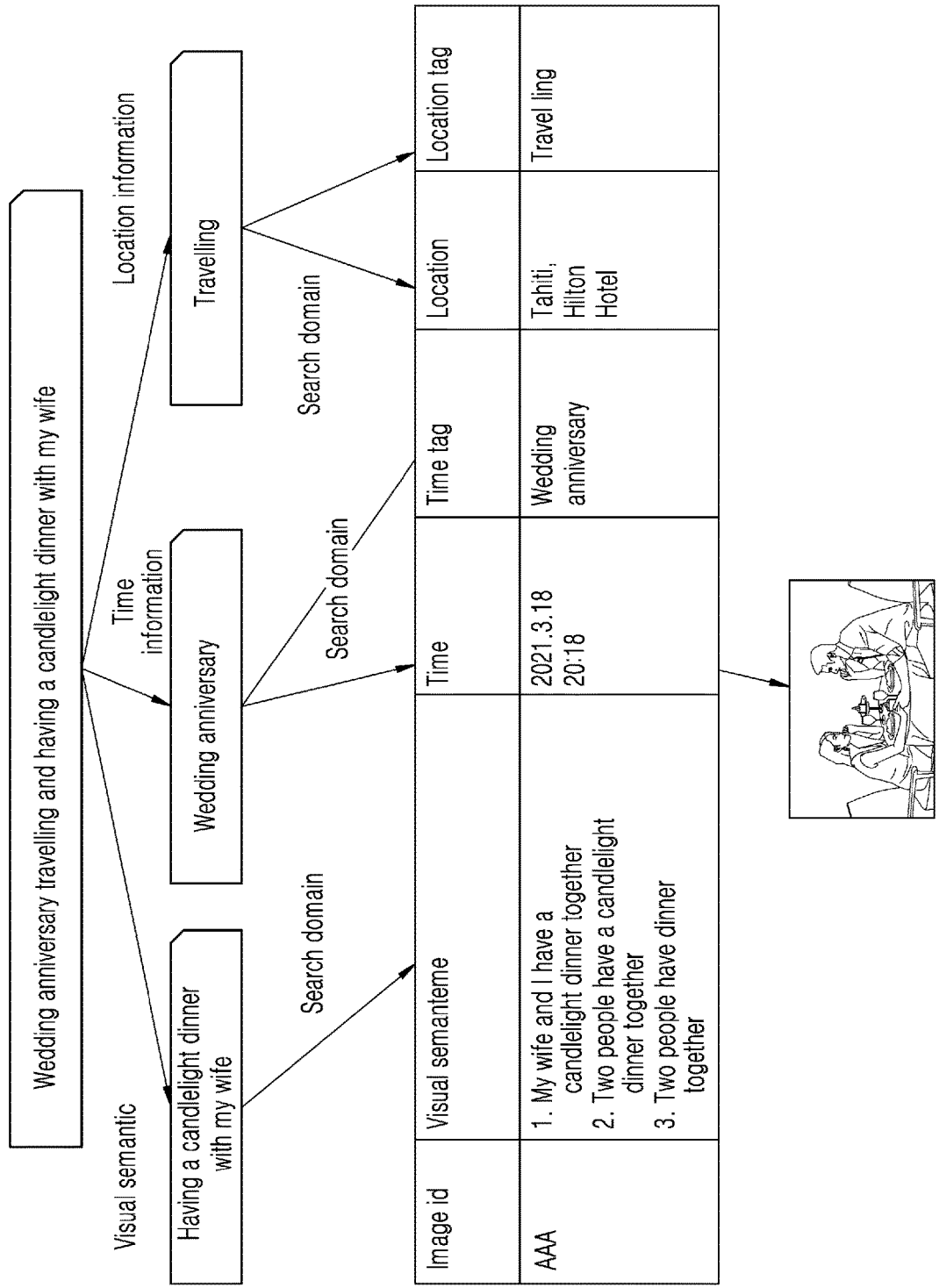
FIG. 3 is a diagram of an image search process based on some embodiments.

Scenario 2: FIG. 3 is a diagram of an image search process according to some embodiments. As shown in FIG. 3, the image search process includes the following operations.

1. Entering a query text or a query text obtained by speech recognition.
2. Conducting intent identification on the entered query text and extracting relevant clues, including visual semantic clues, time clues and location clues.
3. Searching for images with the most similar semantics; wherein image clues are used to search a visual semantic domain, the time clues are used to search a time domain and a time tag domain, and the location clues are used to search a location domain and a location tag domain.
4. Based on an image visual semantic similarity, a time semantic similarity and a location semantic similarity obtained in the previous operation, obtaining final similarity results by weighting, and ranking and outputting the final similarity results.

Figure 4:
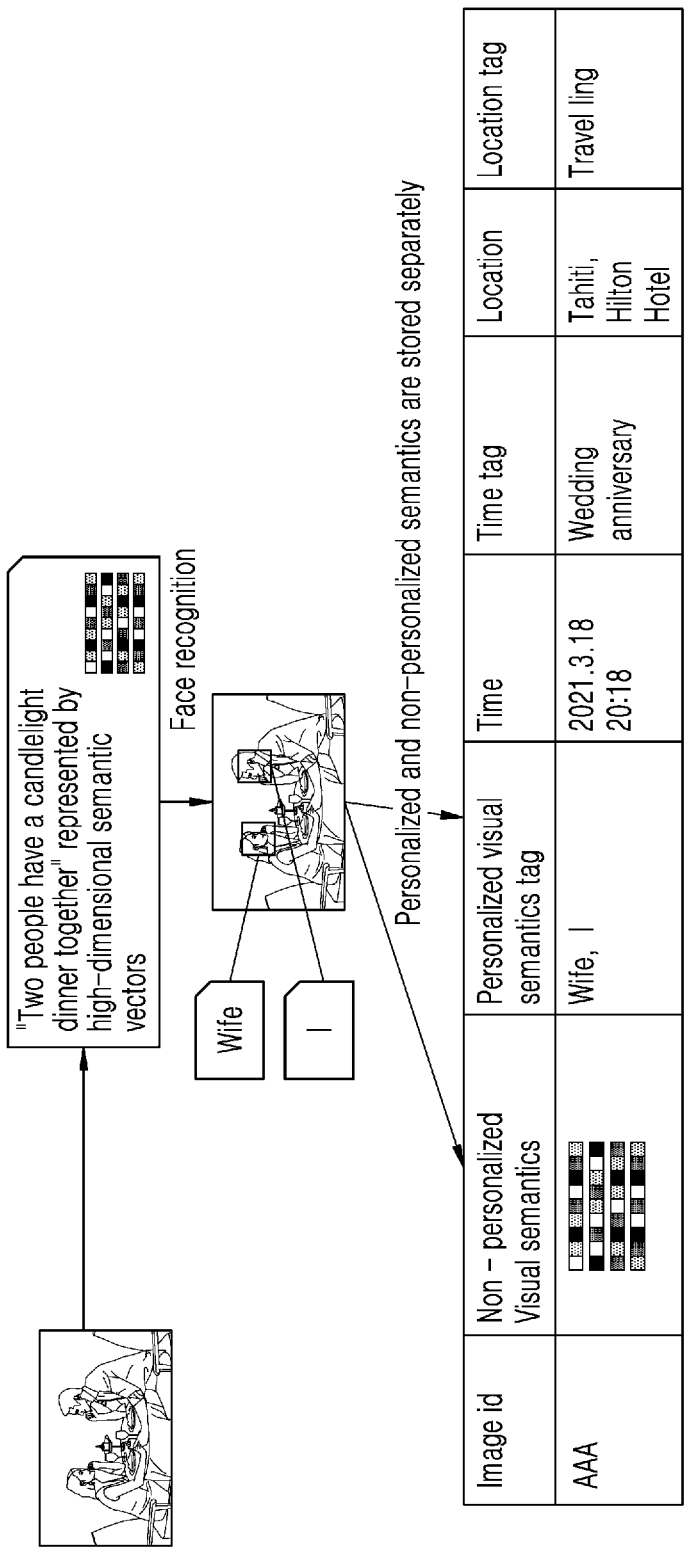
FIG. 4 is a diagram of another process of generating attribute data for a photo taken by a user based on some embodiments.

Scenario 3: FIG. 4 is a diagram of another process of generating attribute data for a photo taken by a user based on some embodiments. The process of FIG. 3 is similar to the method shown in FIG. 2, except that the visual semantics of images are stored separately, that is, high-dimensional semantic vectors are used to represent general non-personalized visual semantics and text tags are used to represent personalized tags. The general non-personalized image visual semantics generate and save high-dimensional semantic vectors through OpenAI CLIP Model and other technologies. The personalized image visual semantics obtained by face recognition are stored in another domain, so that the personalized visual semantics of different users can be stored in different tags, thus meeting the demands of different users for personalized search.

Figure 5:
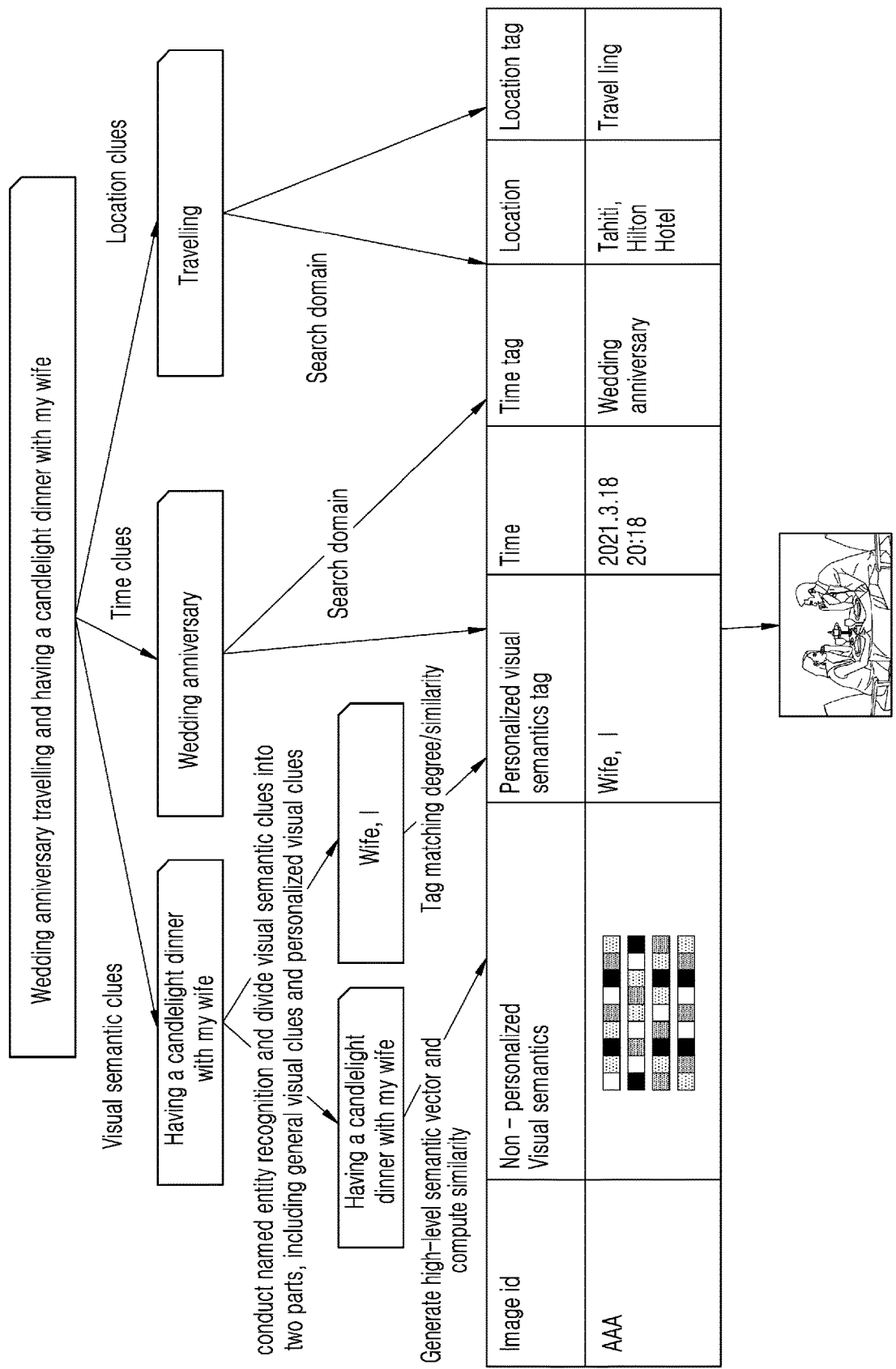
FIG. 5 is a diagram of another image search process based on some embodiments.

Scenario 4: FIG. 5 is a diagram of another picture search process based on some embodiments, which is also a diagram of a method for performing picture search based on the photo attribute data generated by the method in Scenario 3. The picture search process of FIG. 5 includes the following operations.

1. Entering a query text or a query text obtained by speech recognition.
2. Conducting intent identification on the entered query text and extracting relevant clues, including visual semantic clues, time clues and location clues.
3. Using the visual semantic clues to search a visual semantic domain, using the time clues to search a time domain and a time tag domain, and using the location clues to search a location domain and a location tag domain.

The time and location search method is consistent with the process in Scenario 2, but different from Scenario 2, the image clue search method specifically includes conducting named entity recognition on the image clues first, and then extracting identified entities as the personalized visual clues, wherein the visual semantic clues are divided into two parts: general visual clues and personalized visual clues; calculating the similarity of each part, specifically, (1) for the general visual clues, high-dimensional semantic vectors are generated by OpenAI CLIP Model and other technologies, and then the similarity between the vectors is calculated; (2) for the personalized visual clues, search is conducted in a visual semantic personalized tag domain of the attribute data, and the similarity is calculated; and finally, weighing the similarities of the two parts to obtain the final visual semantic similarity.

4. As the final operation in FIG. 5, based on an image visual semantic similarity, a time semantic similarity and a location semantic similarity obtained in the previous operation, obtaining final similarity results by weighting, and ranking and outputting the final similarity results.

The Scenarios 1-4 above illustrate the concrete implementation of the embodiments of this application by taking photos as examples. Implementation based on videos is performed in a fashion similar to the above scenarios, except that in video scenarios, attribute data are generated based on images of key frames, and similarity matching is performed based on attribute data of key frames, which will no longer be illustrated here.

Figure 6:
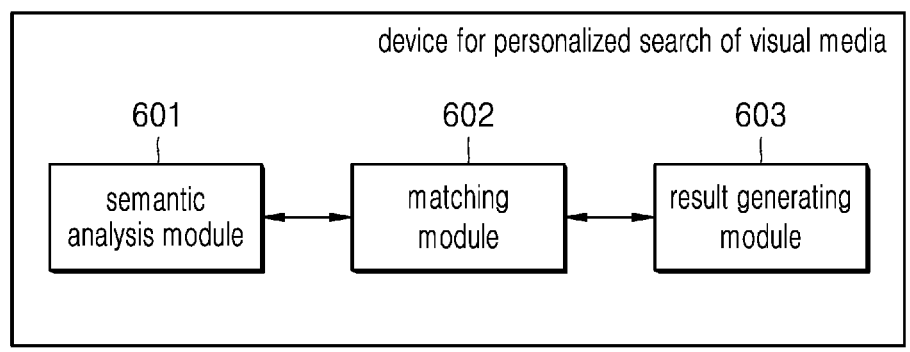
FIG. 6 is a structural diagram of a device according to some embodiments.

Similar to the above embodiments, some embodiments provide a device for personalized search of visual media, as shown in FIG. 6 and described below.

The device includes semantic analysis module 601 for conducting semantic analysis on a visual media query text of a user to obtain visual semantic information, time information and/or location information contained therein.

The device includes a matching module 602 for conducting semantic similarity matching on a result of the semantic analysis and attribute data of each visual medium within a specified search range to obtain a query similarity of the visual medium, wherein the visual medium is an image or a video, and the attribute data include personalized visual semantic information, personalized time information and/or personalized location information.

The device includes a result generating module 603 for generating a corresponding visual media query result based on the query similarity.

In an embodiment, the matching module 602 is specifically used for conducting semantic similarity matching on a result of the semantic analysis and attribute data of each visual medium within a specified search range.

If the result of the semantic analysis contains visual semantic information, the matching module 602 conducts similarity matching on the visual semantic information and the personalized visual semantic information of the visual media to obtain a visual semantic similarity of the visual media.

If the result of the semantic analysis contains time information, the matching module 602 conducts similarity matching on the time information and the personalized time information of the visual media to obtain a time semantic similarity of the visual media.

If the result of the semantic analysis contains location information, the matching module 602 conducts similarity matching on the location information and the personalized location information of the visual media to obtain a location semantic similarity of the visual media.

Based on the visual semantic similarity, the time semantic similarity and/or the location semantic similarity of the visual media, the matching module 602 obtains the query similarity of the visual media according to a weighted calculation method.

In an embodiment, the matching module 602 conducts, when the personalized visual semantic information of the visual media contains a high-dimensional semantic vector, a similarity matching on the visual semantic information and the personalized visual semantic information of the visual media.

The matching module 602 generates a corresponding high-dimensional semantic vector based on the visual semantic information obtained by the semantic analysis; and conducting similarity matching on the high-dimensional semantic vector obtained through conversion and the high-dimensional semantic vector in the personalized visual semantic information of the visual media to obtain a first visual semantic similarity of the visual media.

If the visual semantic information obtained by the semantic analysis contains personalized description information related to a query target and the personalized visual semantic information of the visual media contains personalized tag information, the matching module 602 conducts similarity matching on the personalized description information and the personalized tag information to obtain a second visual semantic similarity of the visual media.

If the second visual semantic similarity exists in the visual media, the matching module 602 obtains the visual semantic similarity of the visual media according to a weighted calculation method based on the first visual semantic similarity and the second visual semantic similarity; otherwise, the matching module 602 takes the first visual semantic similarity as the visual semantic similarity of the visual media.

In an embodiment, the matching module 602 is specifically used for, when the personalized visual semantic information of the visual media only contains text information, conducting similarity matching on the visual semantic information and the personalized visual semantic information of the visual media.

The matching module 602 conducts similarity matching on the visual semantic information obtained by the semantic analysis and the personalized visual semantic information of the visual media to obtain the visual semantic similarity of the visual media.

In an embodiment, the device of FIG. 6 includes a visual media attribute generating module (not shown) for generating the attribute data for the visual media based on a preset personalized database of the currently logged-in user after the visual media are shot with smart terminal equipment.

If the visual medium is a photo, the device of FIG. 6 generates a corresponding visual semantic based on the photo.

If the visual medium is a video, the device of FIG. 6 generates a corresponding visual semantic based on a key frame of the video.

Based on the visual semantic, the device of FIG. 6 searches through a first personalized database of the currently logged-in user to identify a relationship between a shooting object in the visual media and the logged-in user, if the identification is successful, the device of FIG. 6 takes the identified relationship as a personalized tag, and saves the personalized tag together with the visual semantic as the personalized visual semantic information of the visual media; otherwise, the device of FIG. 6 saves the visual semantic as the personalized visual semantic information of the visual media. The first personalized database includes a communication database and/or a picture library.

Based on a shooting location of the visual media, the device of FIG. 6 searches through a second personalized database of the currently logged-in user to identify association information between the shooting location and the logged-in user, if the identification is successful, the device of FIG. 6 takes the identified association information as a personalized tag, and saves the personalized tag together with the shooting location as the personalized location information of the visual media; otherwise, the device of FIG. 6 saves the shooting location as the personalized location information of the visual media. The second personalized database comprises a personalized location database.

Based on a shooting time of the visual media, the device of FIG. 6 searches through a third personalized database of the currently logged-in user to identify association information between the time information and the logged-in user, if the identification is successful, the device of FIG. 6 takes the identified association information as a personalized tag, and saves the personalized tag together with the shooting time as the personalized time information of the visual media; otherwise, saving the shooting time as the personalized time information of the visual media, wherein the third personalized database comprises a personalized time database.

According to the above embodiments of the method for personalized search of visual media, an embodiment of the application realizes equipment for personalized search of visual media, which comprises a processor and a memory, wherein the memory stores an application program executable by the processor for causing the processor to execute the method for personalized search of visual media as described above. Specifically, a system or device may be provided with a storage medium on which software program codes for realizing the functions of any one of the above embodiments are stored, and a computer (or CPU or MPU) of the system or device may read out and execute the program codes stored in the storage medium. In addition, part or all of the actual operations can be completed by an operating system operated on the computer based on instructions of the program codes. The program codes read from the storage medium can also be written into a memory arranged in an expansion board inserted into the computer or into a memory arranged in an expansion unit connected with the computer, and then part or all of the actual operations can be executed by a CPU installed on the expansion board or expansion unit based on the instructions of the program codes, thereby realizing the functions of any one of the above embodiments of the method for personalized search of visual media.

The memory can be embodied as various storage media such as electrically erasable programmable read only memory (EEPROM), flash memory, and programmable program read only memory (PROM). The processor can be implemented to comprise one or more central processing units or one or more field programmable gate arrays, wherein the field programmable gate arrays integrate one or more central processing unit cores. Particularly, the central processing unit or the central processing unit core can be implemented as a CPU or MCU.

An embodiment of the application realizes a computer program product, which comprises a computer program/instruction, and when the computer program/instruction is executed by a processor, the operations of personalized search of visual media as described above are realized.

It should be noted that not all operations and modules in the above-mentioned processes and structural diagrams are necessary, and some operations or modules can be omitted according to actual needs. The execution order of the operations is not fixed and can be adjusted as needed. The division of the modules is only to facilitate the description of different functions. In actual implementation, one module can be implemented as multiple modules, the functions of multiple modules can also be realized by one module, and the modules can be located in the same device or different devices.

Hardware modules in various embodiments can be implemented by a mechanical or electronic means. For example, a hardware module may comprise specially designed permanent circuits or logic devices (such as special-purpose processors, like FPGA or ASIC) for performing specific operations. The hardware module may also comprise programmable logic devices or circuits (such as general purpose processors or other programmable processors) temporarily configured by software for performing specific operations. Whether the hardware modules are implemented by a mechanical means, a special permanent circuit or a temporarily configured circuit (such as configured by software) can be decided by taking consideration of cost and time.

A module of this application, for example the modules of FIG. 6, may be implemented by a processor executing software, by a custom hardware chip or circuit and/or by a combination of a processor executing software and a custom hardware chip or circuit.

Herein, "schematic" means "serving as an instance, example or explanation", and any diagram or embodiment described as "schematic" herein should not be interpreted as a more preferred or advantageous technical solution. For the sake of conciseness, only the parts related to the embodiments are schematically shown in each drawing, and they do not represent the actual structure of the product. In addition, in order to make the drawings simple and easy to understand, in some figures, only one of the components with the same structure or function is shown schematically, or only one of them is marked. Herein, "one" does not mean to limit the number of relevant parts of the embodiments to "only one", and "one" does not mean to exclude the situation that the number of relevant parts of the embodiments is "more than one". Herein, "upper", "lower", "front", "rear", "left", "right", "inner", "outer" and so on are only used to express the relative positional relationship between related parts, but not to limit the absolute positions of these related parts.

The above embodiments are only preferred ones of the embodiments and are not intended to limit the scope of protection of the embodiments. Any modifications, equivalent substitutions and improvements made based on the spirit and principle of the embodiments shall be included in the scope of protection of the disclosure.

The invention claimed is:

1. A method for personalized search of visual media performed using an electronic device, the method comprising:
    obtaining a visual media query text of a user via a user interface of the electronic device;
    conducting, by the electronic device, semantic analysis on the visual media query text of the user to obtain at least one of visual semantic information, time information or location information contained therein;
    conducting, by the electronic device, semantic similarity matching on a result of the semantic analysis and attribute data of each visual medium within a specified search range to obtain a query similarity of the visual medium, wherein the visual medium is an image or a video, and the attribute data is regarding the user of the electronic device and includes at least one of personalized visual semantic information that comprises at least one user created personalized tag indicating relationship with the user, personalized time information, and personalized location information, wherein the conducting semantic similarity matching on the result of the semantic analysis and the attribute data of each visual medium within the specified search range comprises:
        when the result of the semantic analysis contains the location information, conducting similarity matching on the location information and the personalized location information of the visual media to obtain a location semantic similarity of the visual media; and
        based on the location semantic similarity of the visual media, obtaining the query similarity of the visual medium according to a weighted calculation method;
    generating, by the electronic device, a corresponding visual media query result based on the query similarity;
    obtaining, by the electronic device, a search result indicating visual media based on the corresponding visual media query result; and
    providing, by the electronic device, the search result via the user interface.

2. The method according to claim 1, wherein the conducting semantic similarity matching on the result of the semantic analysis and the attribute data of each visual medium within the specified search range further comprises:
    if the result of the semantic analysis contains the visual semantic information, conducting similarity matching on the visual semantic information and the personalized visual semantic information of the visual media to obtain a visual semantic similarity of the visual media; and
    if the result of the semantic analysis contains the time information, conducting similarity matching on the time information and the personalized time information of the visual media to obtain a time semantic similarity of the visual media; and
    based on the at least one of the visual semantic similarity, the time semantic similarity or the location semantic similarity of the visual media, obtaining the query similarity of the visual medium according to a weighted calculation method.

3. The method according to claim 2, wherein when the personalized visual semantic information of the visual media contains a high-dimensional semantic vector, conducting similarity matching on the visual semantic information and the personalized visual semantic information of the visual media comprises:
generating a corresponding high-dimensional semantic vector based on the visual semantic information obtained by the semantic analysis; and conducting similarity matching on the high-dimensional semantic vector obtained through conversion and the high-dimensional semantic vector in the personalized visual semantic information of the visual media to obtain a first visual semantic similarity of the visual media;
if the visual semantic information obtained by the semantic analysis contains personalized description information related to a query target and the personalized visual semantic information of the visual media contains personalized tag information, conducting similarity matching on the personalized description information and the personalized tag information to obtain a second visual semantic similarity of the visual media; and
if the second visual semantic similarity exists in the visual media, obtaining the visual semantic similarity of the visual media according to the weighted calculation method based on the first visual semantic similarity and the second visual semantic similarity; otherwise, taking the first visual semantic similarity as the visual semantic similarity of the visual media.

4. The method according to claim 2, wherein when the personalized visual semantic information of the visual media only contains text information, conducting similarity matching on the visual semantic information and the personalized visual semantic information of the visual media comprises: conducting similarity matching on the visual semantic information obtained by the semantic analysis and the personalized visual semantic information of the visual media to obtain the visual semantic similarity of the visual media.

5. The method according to claim 1, further comprising: generating the attribute data for the visual media based on a preset personalized database of a currently logged-in user after the visual media are shot with smart terminal equipment, comprising:
if the visual medium is a photo, generating a first corresponding visual semantic based on the photo;
if the visual medium is the video, generating a second corresponding visual semantic based on a key frame of the video; and
based on the first corresponding visual semantic or the second corresponding visual semantic, searching through a first personalized database of the currently logged-in user to identify a relationship between a shooting object in the visual media and the currently logged-in user, if the identification is successful, taking the identified relationship as a first personalized tag, and saving the first personalized tag together with the first corresponding visual semantic or the second corresponding visual semantic as the personalized visual semantic information of the visual media;
otherwise, saving the first corresponding visual semantic or the second corresponding visual semantic as the personalized visual semantic information of the visual media, wherein the first personalized database comprises at least one of a communication database or a picture library.

6. The method according to claim 5, wherein generating the attribute data for the visual media based on a preset personalized database of a currently logged-in user after the visual media are shot with smart terminal equipment, comprising:
based on a shooting location of the visual media, searching through a second personalized database of the currently logged-in user to identify first association information between the shooting location and the currently logged-in user, if the identification is successful, taking the identified first association information as a second personalized tag, and saving the second personalized tag together with the shooting location as the personalized location information of the visual media; otherwise, saving the shooting location as the personalized location information of the visual media, wherein the second personalized database comprises a personalized location database.

7. The method according to claim 6, wherein generating the attribute data for the visual media based on a preset personalized database of a currently logged-in user after the visual media are shot with smart terminal equipment, comprising:
based on a shooting time of the visual media, searching through a third personalized database of the currently logged-in user to identify second association information between the time information and the currently logged-in user, if the identification is successful, taking the identified second association information as a third personalized tag, and saving the third personalized tag together with the shooting time as the personalized time information of the visual media; otherwise, saving the shooting time as the personalized time information of the visual media, wherein the third personalized database comprises a personalized time database.

8. The method according to claim 1, wherein the at least one user created personalized tag comprises identifying text, corresponding to an individual.

9. The method according to claim 1, wherein the identifying text, corresponding to an individual, is obtained through facial recognition.

10. An electronic device for personalized search of visual media, comprising at least one processor and a memory, wherein the memory is configured to store an application program executable by the at least one processor and configuring the at least one processor to:
obtain a visual media query text of a user via a user interface of the electronic device;
conduct semantic analysis on the visual media query text of the user to obtain at least one of visual semantic information, time information or location information contained therein;
conduct semantic similarity matching on a result of the semantic analysis and attribute data of each visual medium within a specified search range to obtain a query similarity of the visual medium, wherein the visual medium is an image or a video, and the attribute data is regarding the user of the electronic device and include at least one of personalized visual semantic information that comprises at least one user created personalized tag indicating relationship with the user, personalized time information, and personalized location information, wherein the conducting semantic similarity matching on the result of the semantic analysis and the attribute data of each visual medium within the specified search range comprises:
when the result of the semantic analysis contains the location information, conducting similarity matching on the location information and the personalized location information of the visual media to obtain a location semantic similarity of the visual media; and
based on the location semantic similarity of the visual media, obtaining the query similarity of the visual medium according to a weighted calculation method;
generate a corresponding visual media query result based on the query similarity;
obtain a search result indicating visual media based on the corresponding visual media query result; and
providing the search result via the user interface.

11. The electronic device according to claim 10, wherein:
if the result of the semantic analysis contains the visual semantic information, the at least one processor is further configured to conduct similarity matching on the visual semantic information and the personalized visual semantic information of the visual media to obtain a visual semantic similarity of the visual media;
if the result of the semantic analysis contains the time information, the at least one processor is further configured to conduct similarity matching on the time information and the personalized time information of the visual media to obtain a time semantic similarity of the visual media; and
based on the at least one of the visual semantic similarity, the time semantic similarity or the location semantic similarity of the visual media, the at least one processor is further configured to obtain the query similarity of the visual medium according to a weighted calculation method.

12. The electronic device according to claim 11, wherein when the personalized visual semantic information of the visual media contains a high-dimensional semantic vector, and the at least one processor is configured to conduct similarity matching on the visual semantic information and the personalized visual semantic information of the visual media by:
generating a corresponding high-dimensional semantic vector based on the visual semantic information obtained by the semantic analysis; and conducting similarity matching on the high-dimensional semantic vector obtained through conversion and the high-dimensional semantic vector in the personalized visual semantic information of the visual media to obtain a first visual semantic similarity of the visual media;
if the visual semantic information obtained by the semantic analysis contains personalized description information related to a query target and the personalized visual semantic information of the visual media contains personalized tag information, conducting similarity matching on the personalized description information and the personalized tag information to obtain a second visual semantic similarity of the visual media; and
if the second visual semantic similarity exists in the visual media, obtaining the visual semantic similarity of the visual media according to the weighted calculation method based on the first visual semantic similarity and the second visual semantic similarity; otherwise, taking the first visual semantic similarity as the visual semantic similarity of the visual media.

13. The electronic device according to claim 11, wherein when the personalized visual semantic information of the visual media only contains text information, the at least one processor is further configured to conduct similarity matching on the visual semantic information obtained by the semantic analysis and the personalized visual semantic information of the visual media to obtain the visual semantic similarity of the visual media.

14. The electronic device according to claim 11, wherein the at least one processor is further configured to generate the attribute data for the visual media based on a preset personalized database of a currently logged-in user after the visual media are shot with smart terminal equipment, by:
if the visual medium is a photo, generating a first corresponding visual semantic based on the photo;
if the visual medium is the video, generating a second corresponding visual semantic based on a key frame of the video;
based on the first corresponding visual semantic or the second corresponding visual semantic, search through a first personalized database of the currently logged-in user to identify a relationship between a shooting object in the visual media and the currently logged-in user, if the identification is successful, take the identified relationship as a first personalized tag, and save the first personalized tag together with the first corresponding visual semantic or the second corresponding visual semantic as the personalized visual semantic information of the visual media; otherwise, save the first corresponding visual semantic or the second corresponding visual semantic as the personalized visual semantic information of the visual media, wherein the first personalized database comprises at least one of a communication database or a picture library.

15. The electronic device according to claim 14, wherein the at least one processor is further configured to:
based on a shooting location of the visual media, search through a second personalized database of the currently logged-in user to identify first association information between the shooting location and the currently logged-in user, if the identification is successful, take the identified first association information as a second personalized tag, and save the second personalized tag together with the shooting location as the personalized location information of the visual media; otherwise, save the shooting location as the personalized location information of the visual media, wherein the second personalized database comprises a personalized location database.

16. The electronic device according to claim 15, wherein the at least one processor is further configured to:
based on a shooting time of the visual media, search through a third personalized database of the currently logged-in user to identify second association information between the time information and the currently logged-in user, if the identification is successful, take the identified second association information as a third personalized tag, and save the third personalized tag together with the shooting time as the personalized time information of the visual media; otherwise, save the shooting time as the personalized time information of the visual media, wherein the third personalized database comprises a personalized time database.

17. The electronic device according to claim 10, wherein the at least one user created personalized tag comprises identifying text, corresponding to an individual.

18. The electronic device according to claim 10, wherein the identifying text, corresponding to an individual, is obtained through facial recognition.

19. A non-transitory computer readable storage medium, having a computer readable instruction stored thereon, wherein the computer readable instruction is configured to control an electronic device to execute a method for personalized search of visual media, the method comprising:

obtaining a visual media query text of a user via a user interface of the electronic device;

conducting semantic analysis on the visual media query text of the user to obtain at least one of visual semantic information, time information, or location information contained therein;

conducting semantic similarity matching on a result of the semantic analysis and attribute data of each visual medium within a specified search range to obtain a query similarity of the visual medium, wherein the visual medium is an image or a video, and the attribute data is regarding the user of the electronic device and include at least one of personalized visual semantic information that comprises at least one user created personalized tag indicating relationship with the user, personalized time information, and personalized location information, wherein the conducting semantic similarity matching on the result of the semantic analysis and the attribute data of each visual medium within the specified search range comprises:

when the result of the semantic analysis contains the location information, conducting similarity matching on the location information and the personalized location information of the visual media to obtain a location semantic similarity of the visual media; and based on the location semantic similarity of the visual media, obtaining the query similarity of the visual medium according to a weighted calculation method;

generating corresponding visual media query based on the query similarity;

obtaining a search result indicating visual media based on the corresponding visual media query result; and providing the search result via the user interface.

20. The non-transitory computer readable storage medium according to claim 19, wherein the identifying text, corresponding to an individual, is obtained through facial recognition.

* * * * *